US012280474B2

(12) United States Patent
Marten

(10) Patent No.: US 12,280,474 B2
(45) Date of Patent: Apr. 22, 2025

(54) IMPACT TOOL WITH A MULTI-PIECE ANVIL ASSEMBLY

(71) Applicant: MILWAUKEE ELECTRIC TOOL CORPORATION, Brookfield, WI (US)

(72) Inventor: Kyle A. Marten, Plymouth, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 18/737,477

(22) Filed: Jun. 7, 2024

(65) Prior Publication Data

US 2024/0316732 A1 Sep. 26, 2024

Related U.S. Application Data

(63) Continuation of application No. PCT/US2022/052101, filed on Dec. 7, 2022.

(60) Provisional application No. 63/286,870, filed on Dec. 7, 2021.

(51) Int. Cl.
*B25B 21/02* (2006.01)

(52) U.S. Cl.
CPC .................................. *B25B 21/026* (2013.01)

(58) Field of Classification Search
CPC ....... B25B 21/026; B25B 21/00; B25B 21/02; B25B 23/0035; B25B 13/06; B25B 21/004; B25B 23/1475
See application file for complete search history.

(56) References Cited

U.S. PATENT DOCUMENTS

| | | | | |
|---|---|---|---|---|
| 3,734,515 | A | 5/1973 | Dudek | |
| 4,416,338 | A | 11/1983 | Nelson et al. | |
| 4,821,611 | A * | 4/1989 | Izumisawa | B25B 21/004 81/464 |
| 5,163,519 | A | 11/1992 | Mead et al. | |

(Continued)

FOREIGN PATENT DOCUMENTS

| | | | |
|---|---|---|---|
| CN | 212240890 | U | 12/2020 |
| CN | 114619407 | B | 12/2024 |
| WO | 2023107540 | A1 | 6/2023 |

OTHER PUBLICATIONS

International Search Report and Written Opinion for Application No. PCT/US2022/052101 dated Apr. 18, 2023 (11 pages).

*Primary Examiner* — Veronica Martin
(74) *Attorney, Agent, or Firm* — Michael Best & Friedrich LLP

(57) ABSTRACT

An impact tool includes a housing, a motor supported within the housing, and a drive assembly supported within the housing and configured to convert a constant rotational force provided by the motor into a striking rotational force, the drive assembly including an anvil assembly and a hammer configured to deliver the striking rotational force to the anvil assembly. The anvil assembly includes a plurality of interchangeable drive members, each drive member having a shaft portion and a head portion extending from the shaft portion and configured for coupling to a tool element, and an anvil member having a bore configured to receive the shaft portion of a selected drive member of the plurality of interchangeable drive members. The bore and the shaft portion include cooperating spline patterns such that the selected drive member is coupled for co-rotation with the anvil member when received in the bore of the anvil member.

17 Claims, 15 Drawing Sheets

(56) References Cited

U.S. PATENT DOCUMENTS

| | | | |
|---|---|---|---|
| 6,923,271 B2 | 8/2005 | Frauhammer et al. | |
| 7,083,003 B1 | 8/2006 | Pusateri et al. | |
| 7,131,503 B2 | 11/2006 | Furuta et al. | |
| 7,510,023 B1 | 3/2009 | Cheng | |
| 7,770,495 B1 | 8/2010 | Huang | |
| 8,020,630 B2 | 9/2011 | Amend et al. | |
| 8,146,461 B1 | 4/2012 | Su | |
| 8,667,875 B2 | 3/2014 | Haman | |
| 9,079,286 B1 | 7/2015 | Decamillis | |
| 9,314,908 B2 | 4/2016 | Tanimoto et al. | |
| 9,737,978 B2 | 8/2017 | Golden et al. | |
| 10,427,277 B2 | 10/2019 | McClung et al. | |
| 10,434,632 B2 | 10/2019 | Chang | |
| 10,800,015 B2 | 10/2020 | Zhang | |
| 10,974,372 B2 | 4/2021 | Tejima et al. | |
| 11,179,831 B2 | 11/2021 | Zimmermann et al. | |
| 11,247,321 B2 | 2/2022 | Cooper et al. | |
| 11,389,933 B2 | 7/2022 | Chellew | |
| 11,660,681 B2 | 5/2023 | Kawai et al. | |
| 2006/0157261 A1 | 7/2006 | Chen | |
| 2010/0276169 A1* | 11/2010 | Grand | B25B 21/02 173/120 |
| 2011/0056714 A1* | 3/2011 | Elger | B25B 23/0035 173/128 |
| 2012/0292065 A1 | 11/2012 | Hoshi et al. | |
| 2013/0112449 A1 | 5/2013 | Lu | |
| 2014/0069674 A1 | 3/2014 | Tsai | |
| 2017/0036327 A1 | 2/2017 | Murakami et al. | |
| 2018/0311800 A1 | 11/2018 | Chu | |
| 2019/0283221 A1 | 9/2019 | Chen et al. | |
| 2020/0001440 A1 | 1/2020 | Lee | |
| 2023/0158644 A1 | 5/2023 | Murakami et al. | |
| 2023/0381940 A1 | 11/2023 | Xu | |
| 2024/0075595 A1 | 3/2024 | Eardley et al. | |
| 2024/0075604 A1 | 3/2024 | Amend et al. | |

* cited by examiner

IMPACT TOOL WITH A MULTI-PIECE ANVIL ASSEMBLY

CROSS-REFERENCE TO RELATED APPLICATIONS

The present application is a continuation of International Patent Application No. PCT/US2022/052101, filed Dec. 7, 2022, which claims priority to U.S. Provisional Patent Application No. 63/286,870, filed Dec. 7, 2021, the entire contents of each of which is incorporated herein by reference.

FIELD

The present disclosure relates to impact tools, and, more particularly, to anvils for impact tools.

BACKGROUND

Impact tools, such as impact drivers and impact wrenches, provide a striking rotational force, or intermittent applications of torque, to a tool element or workpiece (e.g., a fastener) to either tighten or loosen the fastener. Impact tools are typically used where high torque is needed, such as to tighten relatively large fasteners or to loosen or remove stuck fasteners (e.g., an automobile lug nut on an axle stud) that are otherwise not removable or very difficult to remove using hand tools.

SUMMARY

In some aspects, the techniques described herein relate to an impact tool including: a housing; a motor supported within the housing; and a drive assembly supported within the housing and configured to convert a constant rotational force provided by the motor into a striking rotational force, the drive assembly including an anvil assembly and a hammer configured to deliver the striking rotational force to the anvil assembly, wherein the anvil assembly includes a plurality of interchangeable drive members, each drive member of the plurality of interchangeable drive members having a shaft portion and a head portion extending from the shaft portion and configured for coupling to a tool element, and an anvil member having a bore configured to receive the shaft portion of a selected drive member of the plurality of interchangeable drive members, wherein the bore and the shaft portion include cooperating spline patterns such that the selected drive member is coupled for co-rotation with the anvil member when received in the bore of the anvil member.

In some aspects, the techniques described herein relate to an impact tool including: a housing; a motor supported within the housing; and a drive assembly supported within the housing and configured to convert a constant rotational force provided by the motor into a striking rotational force, the drive assembly including an anvil assembly and a hammer configured to deliver the striking rotational force to the anvil assembly, wherein the anvil assembly includes a drive member having a shaft portion and a head portion extending from the shaft portion and configured for coupling to a tool element, and an anvil member having a bore configured to receive the shaft portion such that the drive member and the anvil member are coupled for co-rotation when the shaft portion is received within the bore.

In some aspects, the techniques described herein relate to a multi-piece anvil for an impact tool, including: an anvil member including a body, an anvil lug extending outwardly from the body, the anvil lug configured to be impacted by a hammer of the impact tool, and a bore extending at least partially through the body; and a drive member including a shaft portion, and a head portion configured to extend outwardly from a housing of the impact tool, the head portion having a plurality of drive surfaces and configured to be coupled to a tool element, wherein the shaft portion includes a first engagement feature, and the anvil member includes a second engagement feature, and wherein the shaft portion is insertable into the bore to couple the drive member for co-rotation with the anvil member via the first engagement feature and the second engagement feature.

Other features and aspects of the disclosure will become apparent by consideration of the detailed description and accompanying drawings. Any feature(s) described herein in relation to one aspect or embodiment may be combined with any other feature(s) described herein in relation to any other aspect or embodiment as appropriate and applicable.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
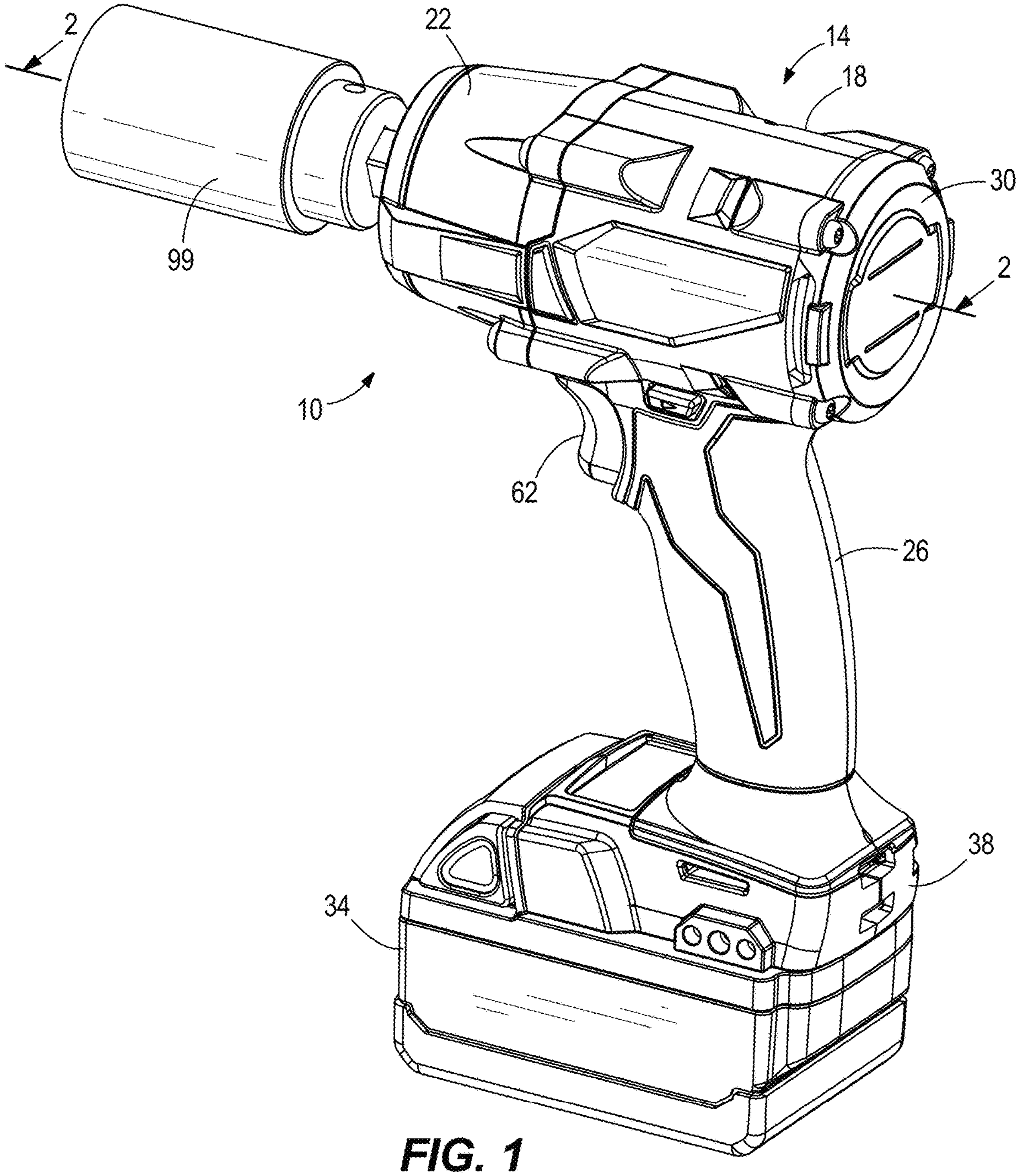
FIG. 1 is a perspective view of an impact tool according to an embodiment of the present disclosure.

FIG. 1 illustrates a power tool, and more specifically, an impact tool in the form of an impact wrench 10. The impact wrench 10 includes a housing 14 with a motor housing portion 18, a front housing portion 22 coupled to the motor housing portion 18 (e.g., by a plurality of fasteners), and a handle portion 26 extending downward from the motor housing portion 18. In the illustrated embodiment, the handle portion 26 and the motor housing portion 18 are defined by cooperating clamshell halves. The illustrated housing 14 also includes an end cap 30 coupled to the motor housing portion 18 opposite the front housing portion 22.

Figure 2:
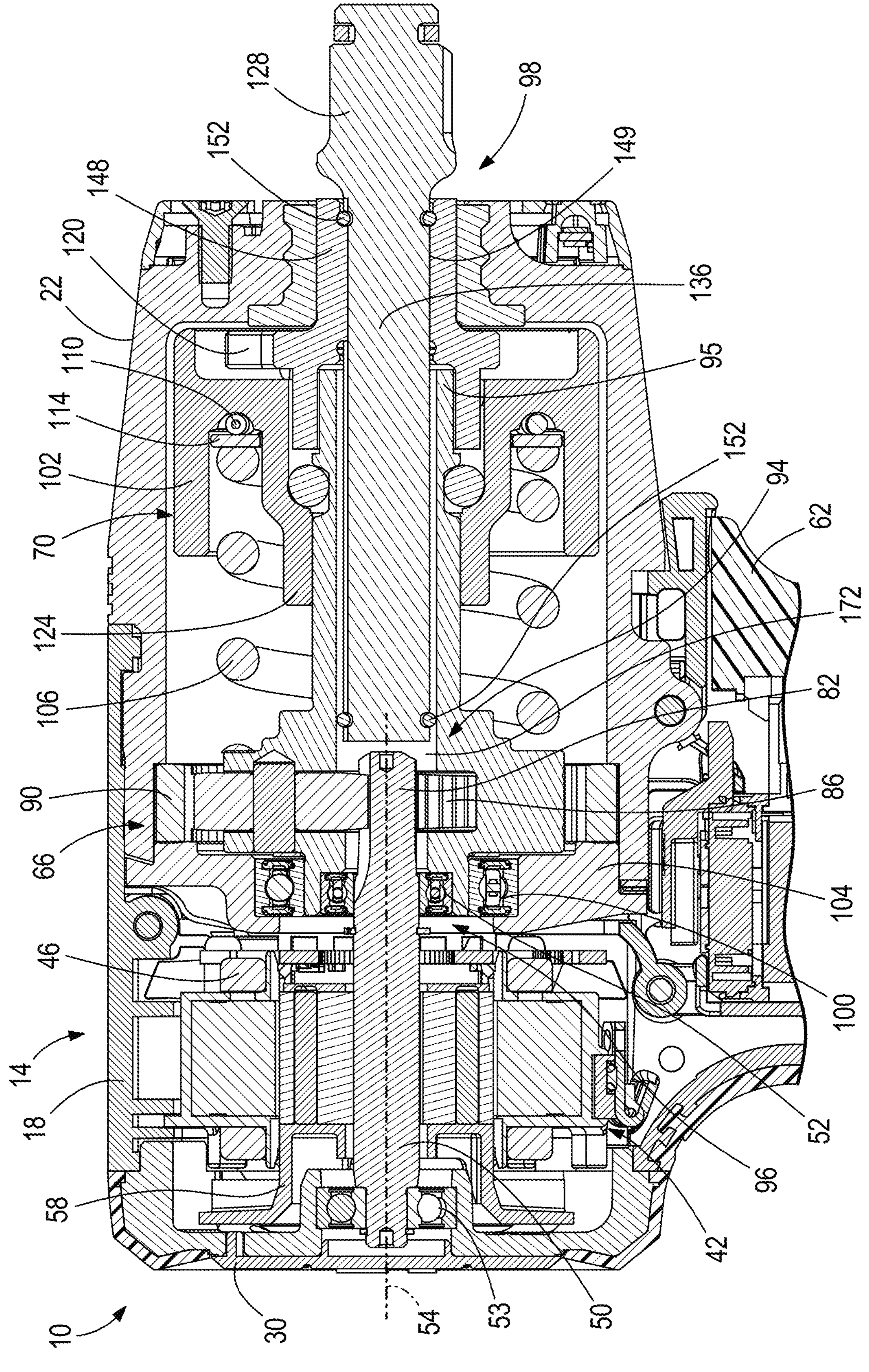
FIG. 2 is a cross-sectional view of the impact tool of FIG. 1, taken along line 2-2 in FIG. 1.

The illustrated impact wrench 10 has a battery 34 removably coupled to a battery receptacle 38 located at a bottom end of the handle portion 26. An electric motor 42 (FIG. 2) is supported within the motor housing portion 18 and receives power from the battery 34 (FIG. 1) via the battery receptacle 38 when the battery 34 is coupled to the battery receptacle 38. In the illustrated embodiment, the motor 42 is a brushless direct current ("BLDC") motor with a stator 46 and a rotor with an output shaft 50 that is supported by front and rear rotor bearings 52, 53 for rotation about an axis 54 relative to the stator 46 (FIG. 2). In other embodiments, other types of motors may be used. A fan 58 is coupled to the output shaft 50 behind the motor 42 to generate an airflow for cooling the motor 42.

The impact wrench 10 also includes a switch (e.g., trigger switch 62; FIG. 1) supported by the housing 14 for operating the motor 42 (e.g., via suitable control circuitry provided on one or more printed circuit board assemblies ("PCBAs") that control power supply and command of the motor 42. In other embodiments, the impact wrench 10 may include a power cord for connecting to a source of AC power. As a further alternative, the impact wrench 10 may be configured to operate using a non-electrical power source (e.g., a pneumatic or hydraulic power source, etc.).

Referring to FIG. 2, the illustrated impact wrench 10 further includes a gear assembly 66 coupled to the motor output shaft 50 and a drive assembly 70 coupled to an output of the gear assembly 66. The gear assembly 66 is at least partially housed within the front housing portion 22. The gear assembly 66 may be configured in any of a number of different ways to provide a speed reduction between the output shaft 50 and an input of the drive assembly 70.

For example, the illustrated gear assembly 66 includes a pinion 82 formed on the motor output shaft 50, a plurality of planet gears 86 meshed with the pinion 82, and a ring gear 90 meshed with the planet gears 86 and rotationally fixed within the front housing portion 22. The planet gears 86 are mounted on a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotate the camshaft 94.

With continued reference to FIG. 2, the illustrated camshaft 94 includes a first or front end 95 and a second or rear end 96 opposite the first end 95 and facing the motor 42. The second end 96 of the camshaft 94 receives and supports an outer race of the front rotor bearing 52. A camshaft bearing 100, which is sleeved onto the second end 96 of the camshaft 94, is supported by a rear gear case cover 104, which is in turn coupled to the front housing 22. In the illustrated embodiment, the camshaft bearing 100 surrounds the front rotor bearing 52.

The illustrated drive assembly 70 further includes an anvil assembly 98 and a hammer 102 supported on and axially slidable relative to the camshaft 94. The anvil assembly 98 extends from the front housing portion 22 and includes a drive member 128 and an anvil member 148. The anvil member 148 includes a central bore 149 extending coaxially with the axis 54. As described in greater detail below with reference to FIGS. 3-8, a body or shaft portion 136 of the drive member 128 is received within the bore 149 to couple the drive member 128 for co-rotation with the anvil member 148.

A tool element 99 (e.g., a socket; FIG. 1) can be coupled to the drive member 128 of the anvil assembly 98 for performing work on a workpiece (e.g., a fastener, bit, or the like). The drive assembly 70 is configured to convert the constant rotational force or torque provided by motor 42 via the gear assembly 66 to a striking rotational force or intermittent applications of torque to the anvil assembly 98 when the reaction torque on the anvil assembly 98 (e.g., a fastener being worked upon) exceeds a certain threshold.

With reference again to FIG. 2, the drive assembly 70 further includes a spring 106 biasing the hammer 102 toward the front of the impact wrench 10 (i.e., in the right direction of FIG. 2). In other words, the spring 106 biases the hammer 102 in an axial direction toward the anvil assembly 98, along the axis 54. A thrust bearing 110 and a thrust washer 114 are positioned between the spring 106 and the hammer 102. The thrust bearing 110 and the thrust washer 114 allow for the spring 106 and the camshaft 94 to continue to rotate relative to the hammer 102 after each impact strike when lugs (not shown) on the hammer 102 engage with corresponding anvil lugs 120, formed on the anvil member 148, and rotation of the hammer 102 momentarily stops. The camshaft 94 further includes cam grooves 124 in which corresponding cam balls (not shown) are received. The cam balls are in driving engagement with the hammer 102 and movement of the cam balls within the cam grooves 124 allows for relative axial movement of the hammer 102 along the camshaft 94 when the hammer lugs and the anvil lugs 120 are engaged and the camshaft 94 continues to rotate.

Figure 3:
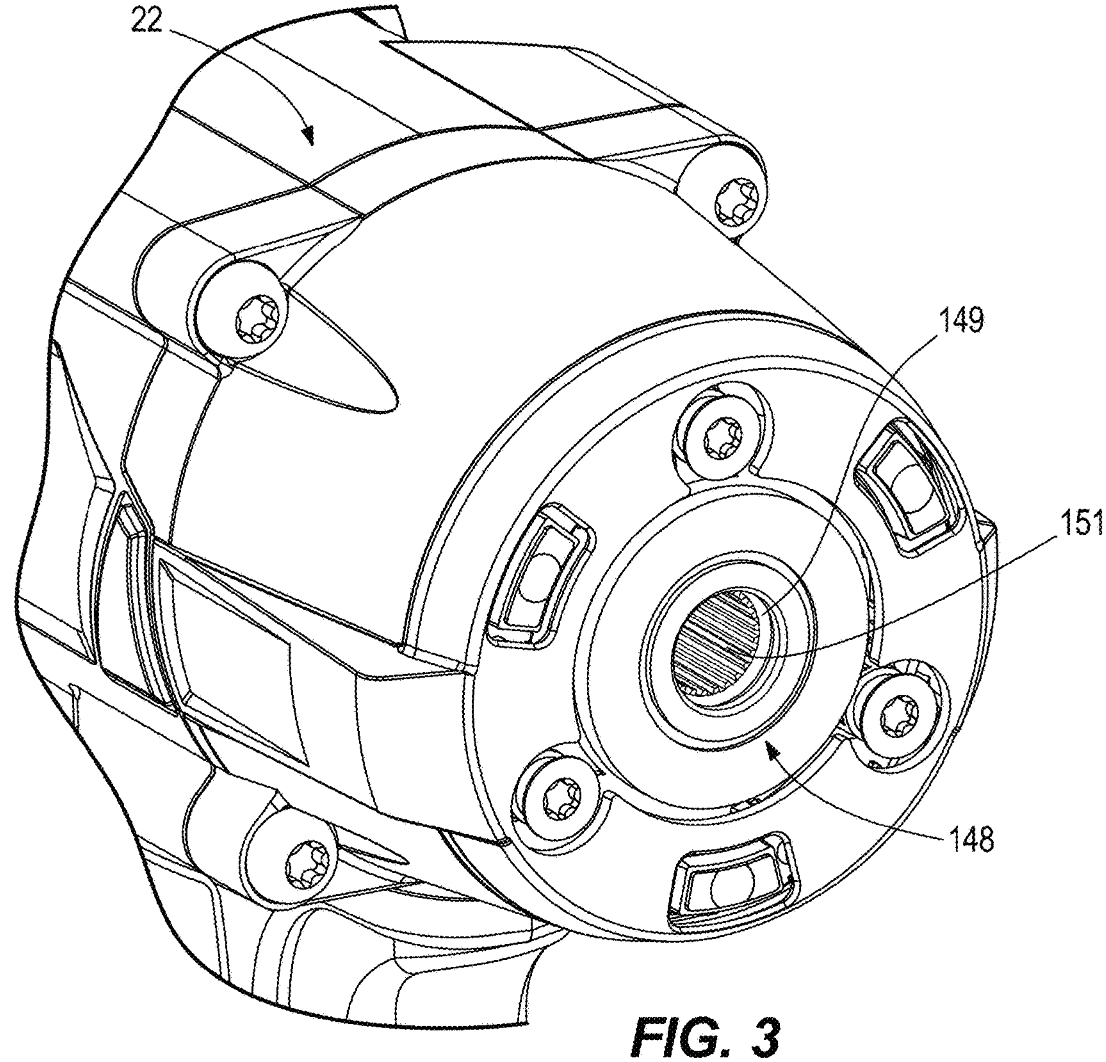
FIG. 3 is a perspective view of a front portion of the impact tool of FIG. 1, illustrating an anvil member.
Figure 4:
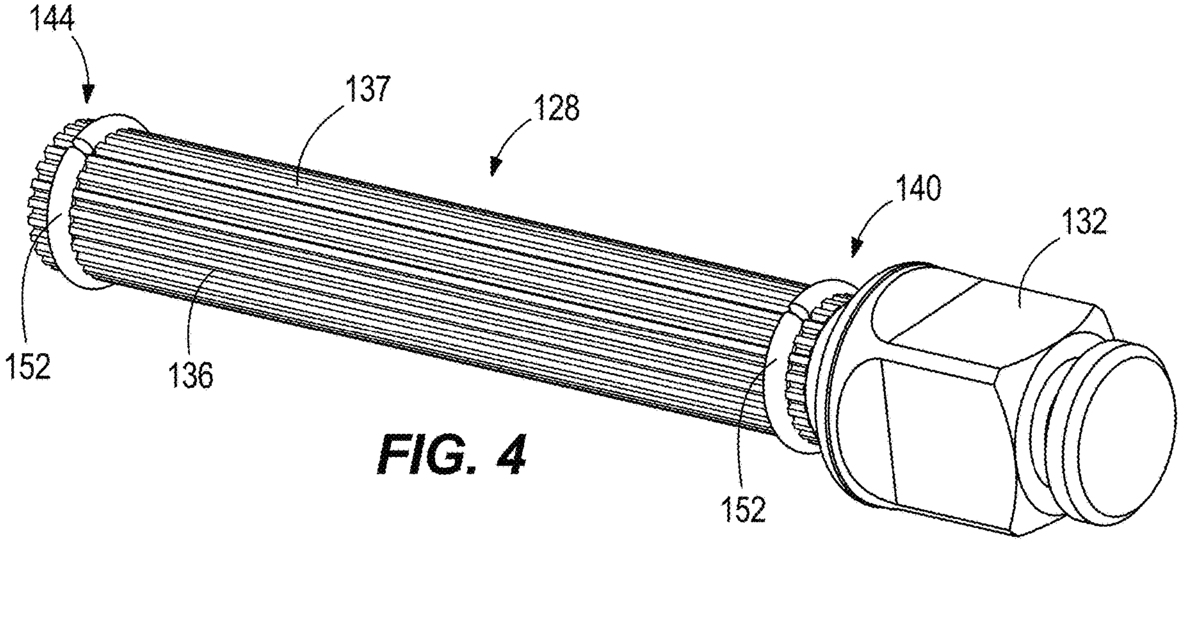
FIG. 4 is a perspective view of a drive member, which is insertable into the anvil member of FIG. 3 to define an anvil assembly of the impact tool of FIG. 1.

Referring to FIGS. 3-4, the drive member 128 and the anvil member 148 of the anvil assembly 98 are illustrated. The shaft portion 136 of the drive member 128 includes a first end 140 and a second end 144 opposite the first end. A head portion 132 of the drive member 128 extends from the first end 140 of the body 136. The head portion 132 is configured to couple to the tool element 99. For example, the illustrated head portion 132 includes a square drive interface, preferably with a standard nominal size (e.g., ⅜", ½", ¾", 1", etc.). In other embodiments, the head portion 132 may include other suitable drive interfaces, such as a spline interface, a hex drive interface, or the like. In some embodiments, the drive member 128 and the anvil member 148 may be made of different materials, and/or include different finishes, surface treatments, or the like such that the drive member 128 and the anvil member 148 may include different material properties.

The shaft portion 136 of the drive member 128 includes a first engagement feature 137, which cooperates with a second engagement feature 151 within the bore 149 of the anvil member 148 to couple the drive member 128 for co-rotation with the anvil member 148. In the illustrated embodiment, the first and second engagement features 137, 151 are cooperating spline geometries, which allow the drive member 128 to move axially along the bore 149 while remaining coupled for co-rotation with the anvil member 148. In other embodiments, the engagement features 137, 151 may have any other geometry suitable for coupling the drive member 128 for co-rotation with the anvil member 148 while permitting axial movement, such as a cooperating key and keyway geometry, an SDS, SDS-Plus, SDS Max, or other similar geometry, or any other non-circular geometry.

Figure 5:
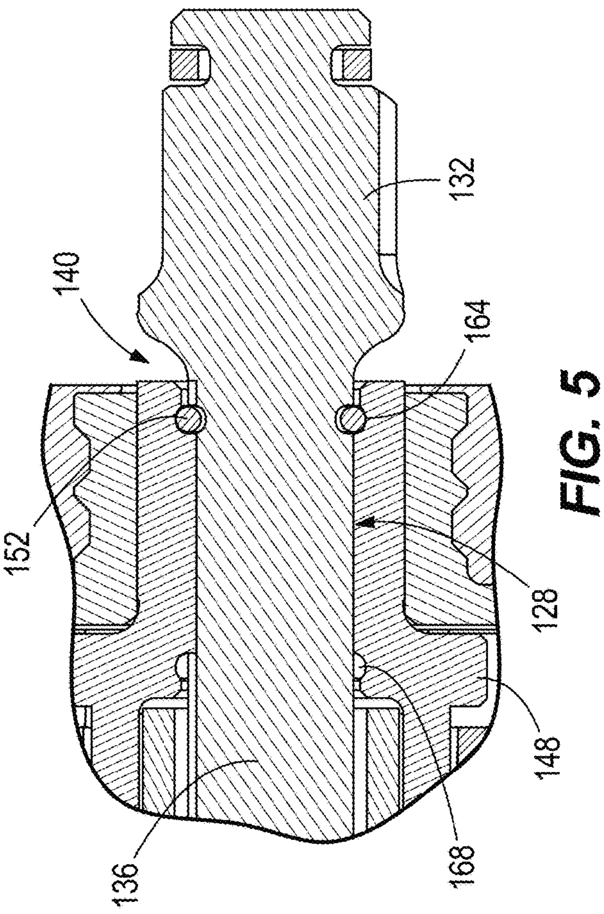
FIG. 5 is an enlarged cross-sectional view of a front portion of the impact tool of FIG. 1, illustrating the drive member in a first position relative to the anvil member.
Figure 6:
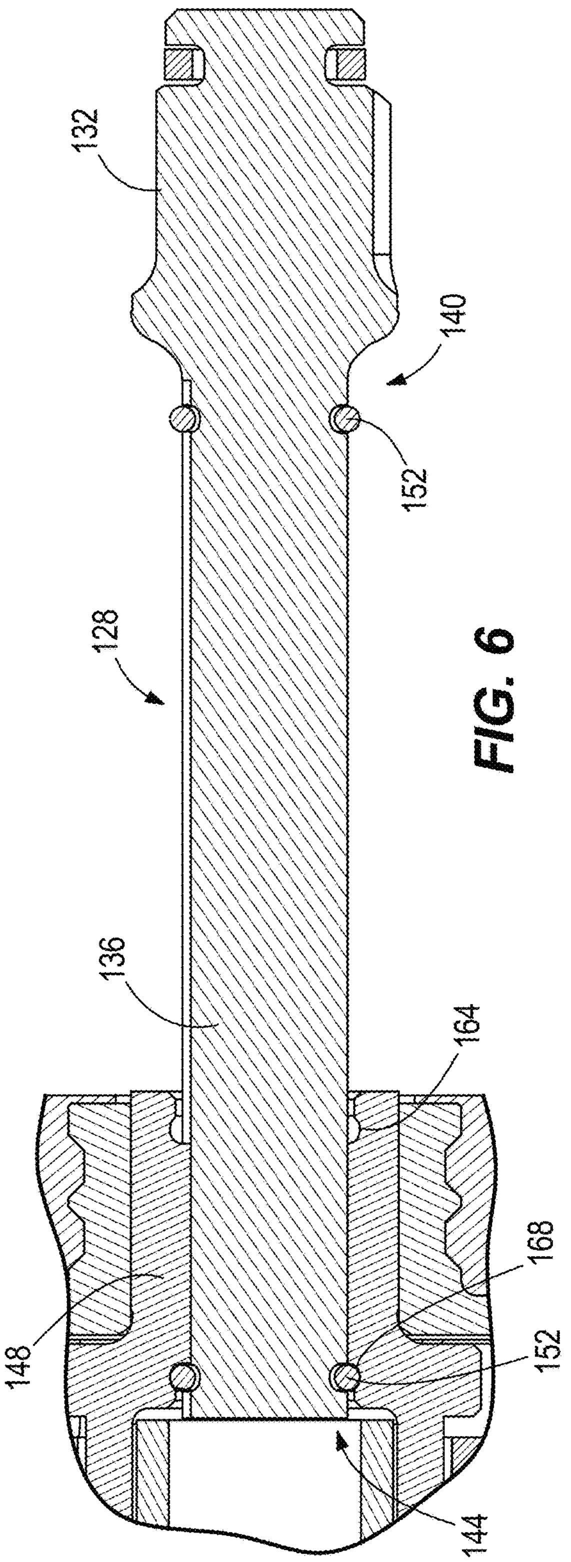
FIG. 6 is an enlarged cross-sectional view of a front portion of the impact tool of FIG. 1, illustrating the drive member in a second position relative to the anvil member.
Figure 7:
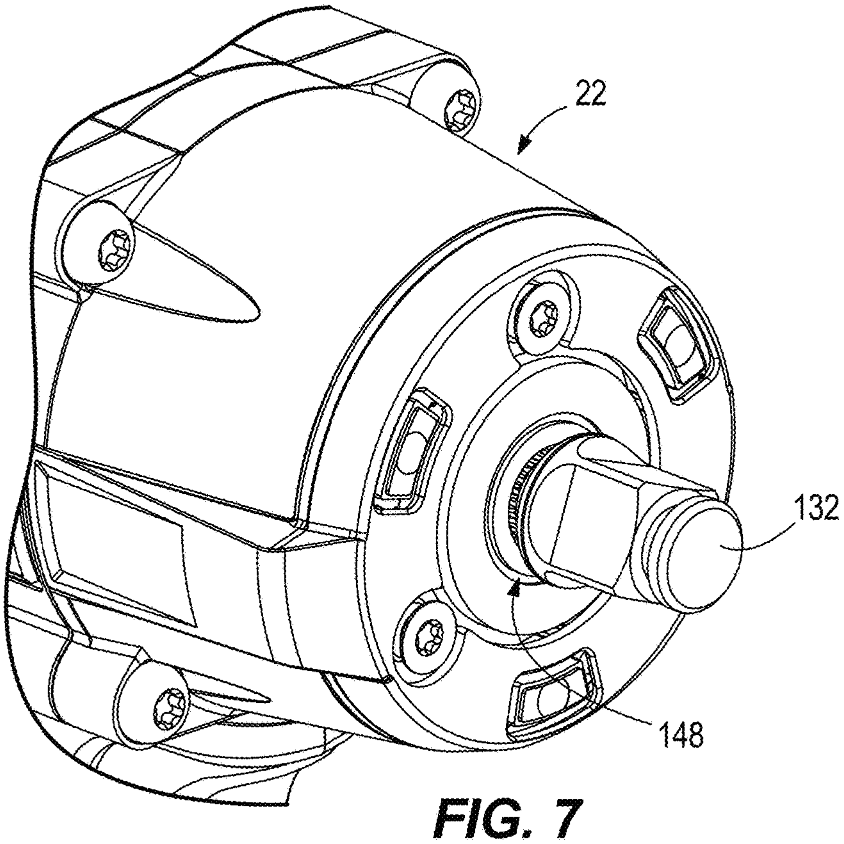
FIG. 7 is a perspective view of a front portion of the impact tool of FIG. 1, illustrating the drive member in the first position.
Figure 8:
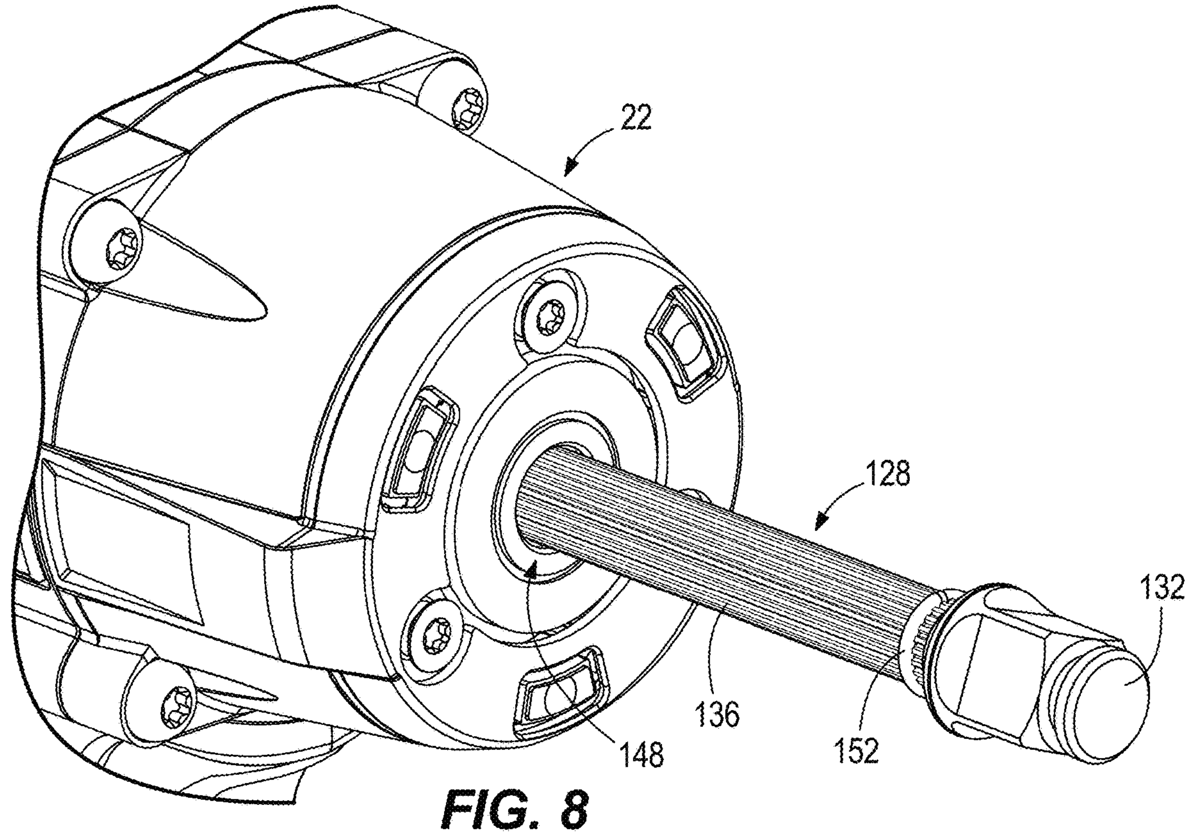
FIG. 8 is a perspective view of a front portion of the impact tool of FIG. 1, illustrating the drive member in the second position.

When the anvil member 148 and the drive member 128 are assembled together to form the anvil assembly 98, the shaft portion 136 of the drive member 128 extends within the interior of the tool 10 along the axis 54. (FIG. 2). In the illustrated embodiment, the drive member 128 is movable relative to the anvil member 148 along the axis 54 between at least two positions (e.g., an extended position, as shown in FIGS. 6 and 8, and a retracted position as shown in FIGS. 5 and 7). At least one friction ring 152 is sleeved onto the body 136 of the drive member 128 to retain the drive member 128 in a selected position. In the illustrated embodiment, the drive member 128 has two friction rings 152 positioned adjacent the first end 140 and the second end 144 of the shaft portion 136, respectively. The friction ring 152 adjacent the first end 140 is received within an annular groove or recess 164 adjacent a front end of the anvil member 148 to lock the drive member 128 in its retracted position. (FIG. 5). The friction ring 152 adjacent the second end 144 is received within a second annular groove 168 offset rearwardly from the first annular groove or recess 164 to lock the drive member 128 in its extended position (FIG. 6).

Referring to FIGS. 5 and 7, when the drive member 128 is in the retracted position, only the head portion 132 of the drive member 128 extends from the front portion 22 of the housing 18, causing the drive member 128 to extend beyond the front portion 22 of the housing 18 at a first distance. In the extended position, as illustrated in FIGS. 6 and 8, the drive member 128 extends from the front portion 22 of the housing 18 at a second distance that is greater than the first distance. Thus, the reach of the anvil assembly 98 is adjustable by moving the drive member between the retracted and extended positions.

Referring back to FIG. 2, the anvil member 148 and the camshaft 94 are each hollow in a direction along the axis 54 so as to allow the drive member 128 to be retracted into the tool 10. As such, when the drive member 128 is in its retracted position, the drive member 128 not only extends rearwardly through the anvil member 148, but the drive member 128 also extends into a central bore 172 in the camshaft 94. In the illustrated embodiment, the bore 172 extends entirely through the length of the camshaft 94, which may also advantageously reduce the weight of the camshaft 94.

In operation of the impact wrench 10, an operator depresses the switch 62 to activate the motor 42, which continuously drives the gear assembly 66 and the camshaft 94 via the output shaft 50. As the camshaft 94 rotates, the cam balls drive the hammer 102 to co-rotate with the camshaft 94, and the hammer lugs engage the anvil lugs 120 on the anvil member 148 to deliver an impact and to rotatably drive the anvil member 148—and thus, the drive member 128 and the tool element 99 coupled to the drive member 128. After each impact, the hammer 102 moves or slides rearward along the camshaft 94, away from the anvil assembly 98, so that the hammer lugs disengage the anvil lugs 120. As the hammer 102 moves rearward, the cam balls situated in the respective cam grooves 124 in the camshaft 94 move rearward in the cam grooves 124. The spring 106 stores some of the rearward energy of the hammer 102 to provide a return mechanism for the hammer 102. After the hammer lugs disengage the respective anvil lugs 120, the hammer 102 continues to rotate and moves or slides forwardly, toward the anvil assembly 98, as the spring 106 releases its stored energy, until the drive surfaces of the hammer lugs re-engage the driven surfaces of the anvil lugs 120 to cause another impact.

To suit a particular task, the user may adjust the drive member 128 between the extended and retracted positions. In other words, the anvil assembly 98 is extendible to vary a reach of the tool 10. As such, the tool 10 may be used in a wider variety of applications and does not have to be replaced with a different tool or used with a different tool element 99 (e.g., an extended reach socket, adapter, or the like) that is specifically used to deliver greater reach. Rather, the anvil assembly 98 can simply be extended or retracted to suit the operation at hand.

Figure 9:
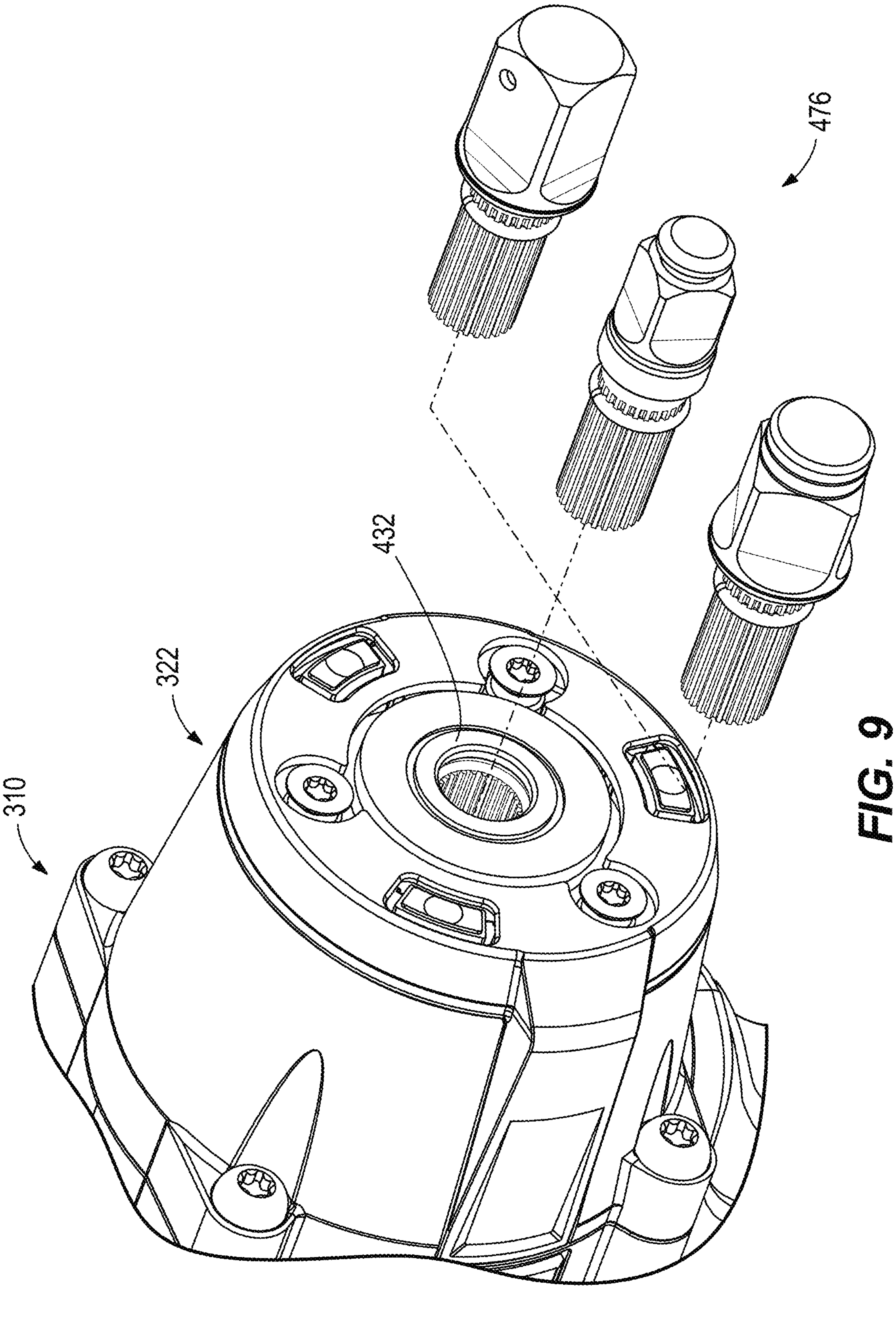
FIG. 9 is a perspective view of a portion of an impact tool according to another embodiment, illustrating a plurality of interchangeable drive members.
Figure 10:
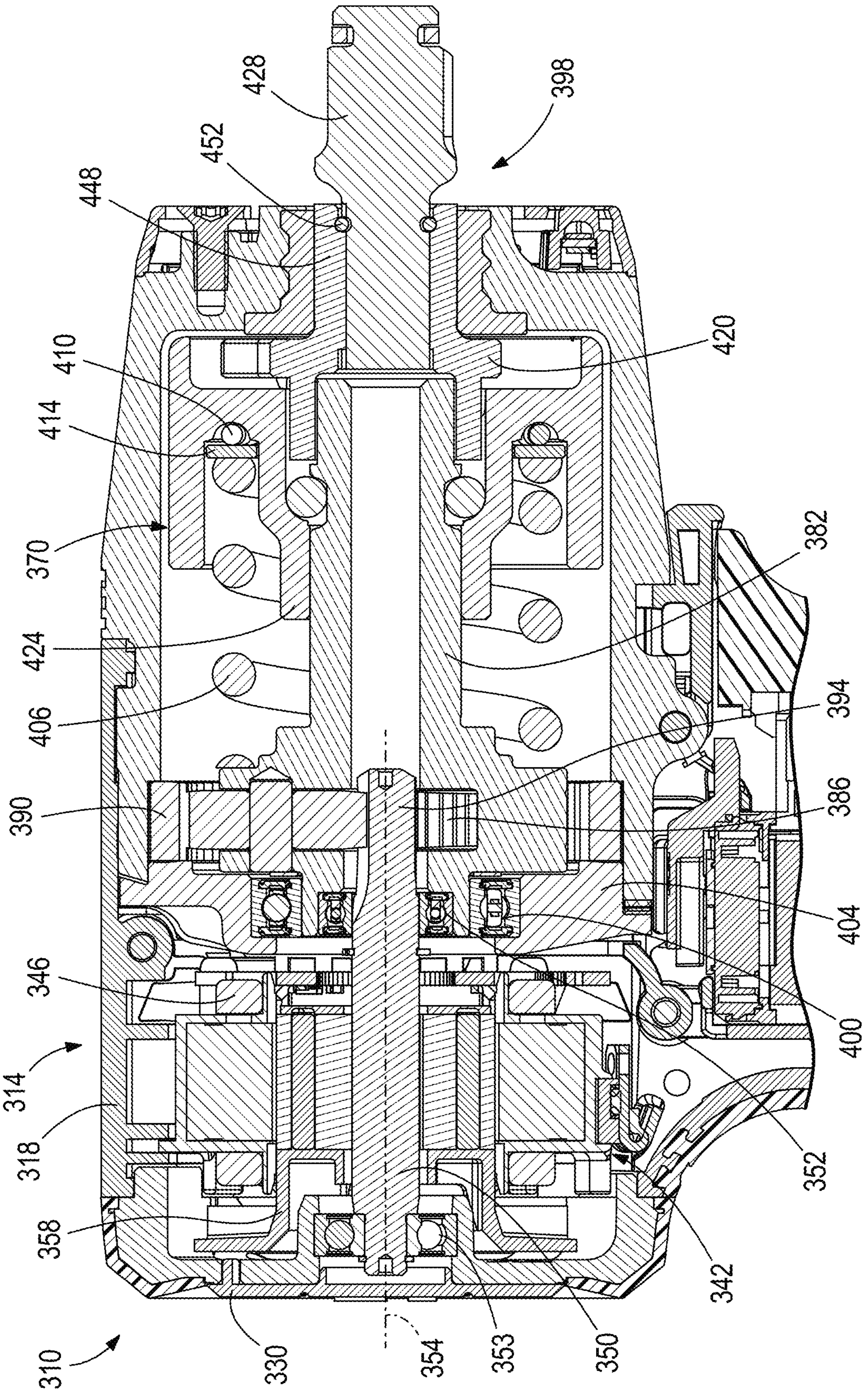
FIG. 10 is a cross-sectional view of the impact tool of FIG. 9, illustrating an anvil member receiving one of the plurality of interchangeable drive members of FIG. 9
Figure 11:
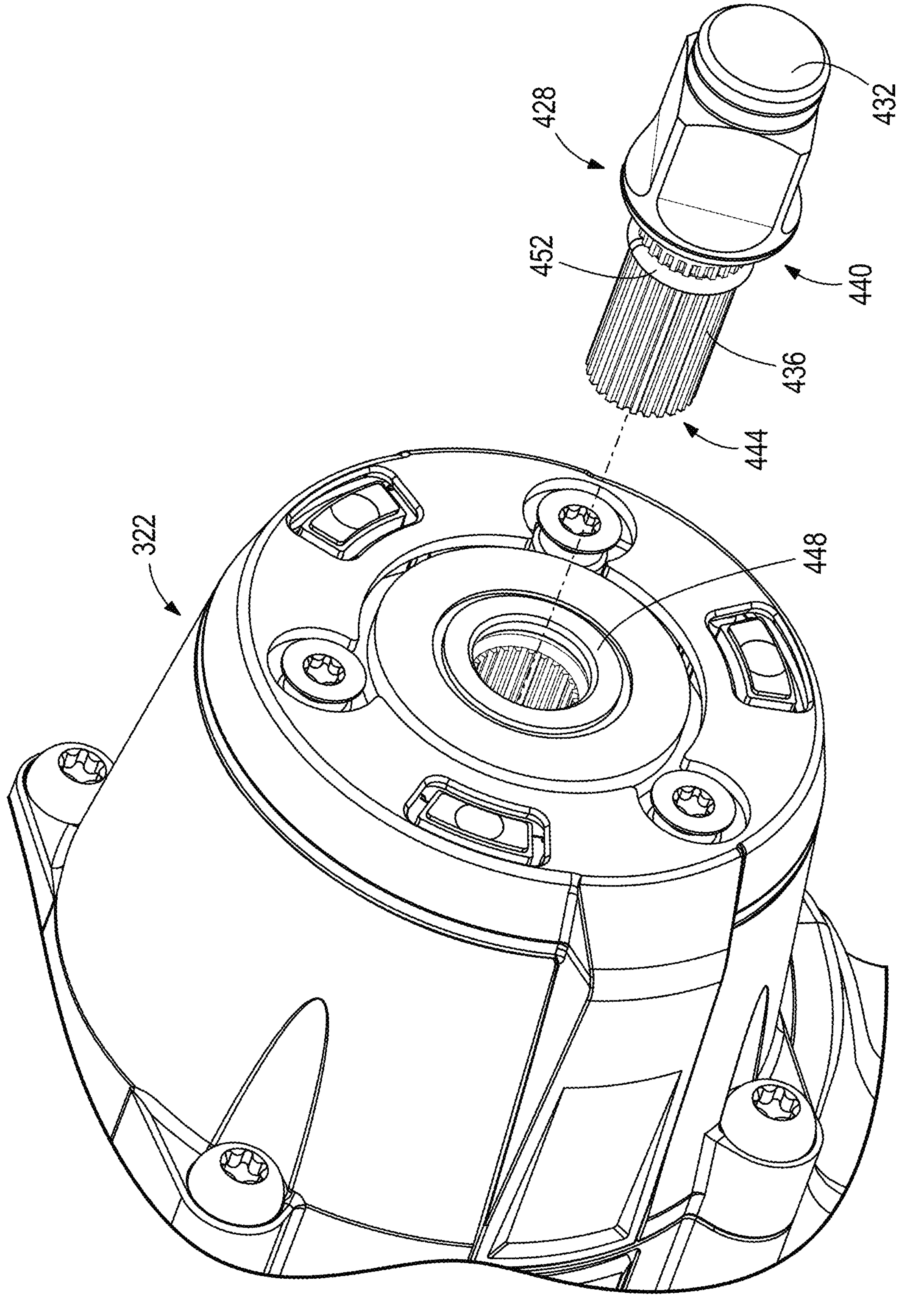
FIG. 11 is an enlarged view of the impact tool of FIG. 10, illustrating the anvil member and one of the plurality of interchangeable drive members of FIG. 9.
Figure 12:
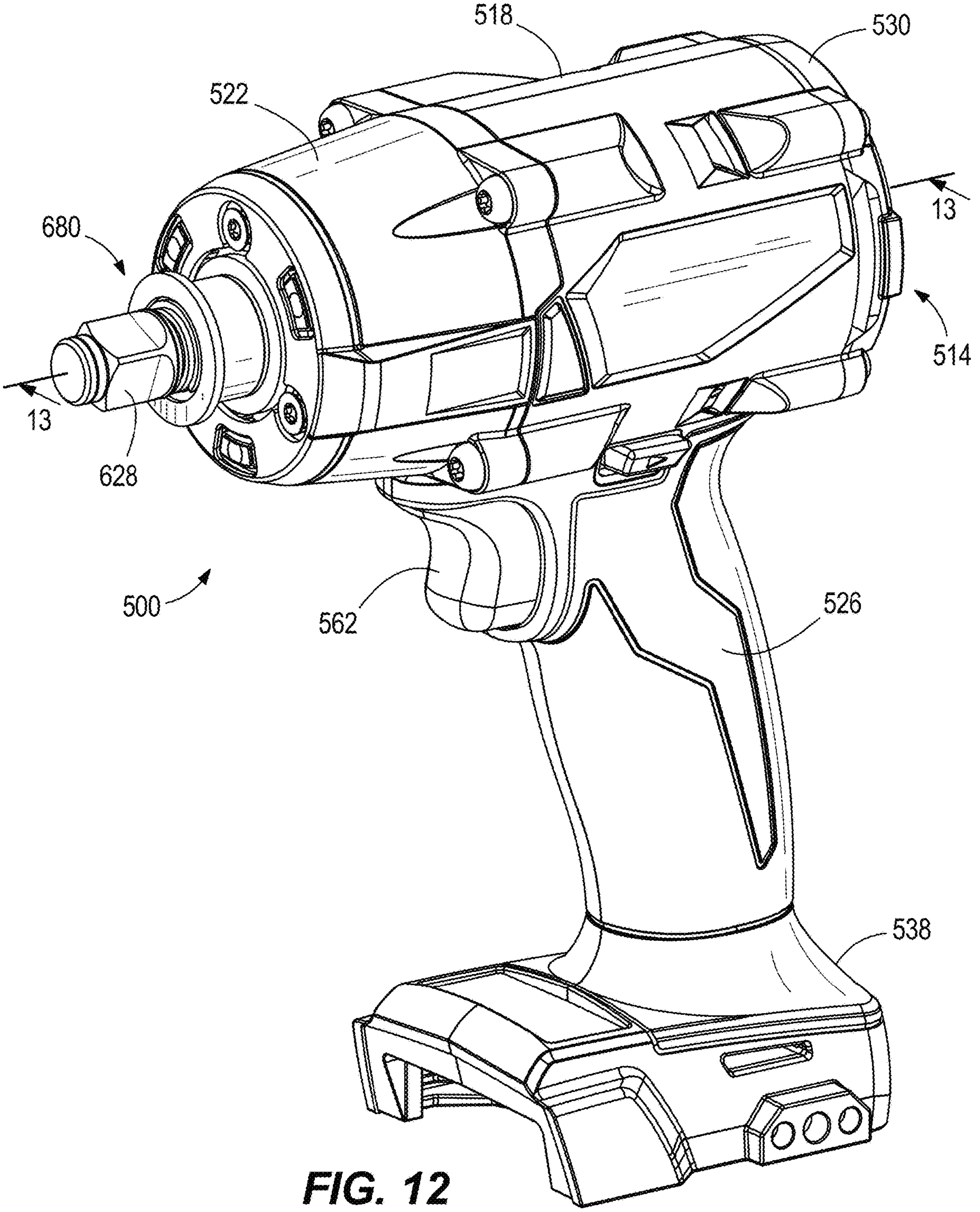
FIG. 12 is a perspective view of an impact tool according to another embodiment, illustrating a retainer assembly.

Referring to FIGS. 9-11, another embodiment of an impact tool 310 is illustrated. The impact tool 310 is similar to the impact tool 10 of FIGS. 1-8; therefore, like structure will be identified by like reference number plus "300" and only the differences will be discussed hereafter.

In the embodiment of FIGS. 9-11, the drive member 428 of the anvil assembly 398 may not be extendible. Rather, the drive member 428 is one of a plurality of interchangeable drive members 476, each having a different length and/or drive geometry (FIG. 9). The anvil member 448 is configured to receive one drive member 428 of the plurality of interchangeable drive members 476, and the drive member 428 can then be removed and substituted with another of the interchangeable drive members 476 to suit a particular fastening task.

Referring to FIG. 11, a friction ring 452 is sleeved onto the body or shaft portion 436 of each drive member 428 of the plurality of interchangeable drive members 476. Each interchangeable drive member 428 can thus be locked into the anvil member 428 by seating the friction ring 452 into a first annular groove or recess 464 of the anvil member 428.

Having the ability to change the plurality of interchangeable drive members 476 allows the anvil assembly 398 to vary in size and form. Based on the application in which the tool 310 will be used, only the drive member 428 of the anvil assembly 398 need be changed rather the tool 310 itself. For example, each of the plurality of interchangeable drive members 476 can have a head with a different nominal size, such as ⅜", ½", ¾", 1", or the like, although the nominal size of each interchangeable drive member 476 is not limited to these measurements. Each of the plurality of interchangeable drive members 476 can also have a different retention structure for the tool element 99, such as a friction ring, a pin detent, and other configurations.

Referring to FIGS. 12-18, another embodiment of an impact tool 500 is illustrated. The impact tool 500 is similar to the impact tool 10 of FIGS. 1-8; therefore, like structure will be identified by like reference number plus "500" and only the differences will be discussed hereafter.

Figure 13:
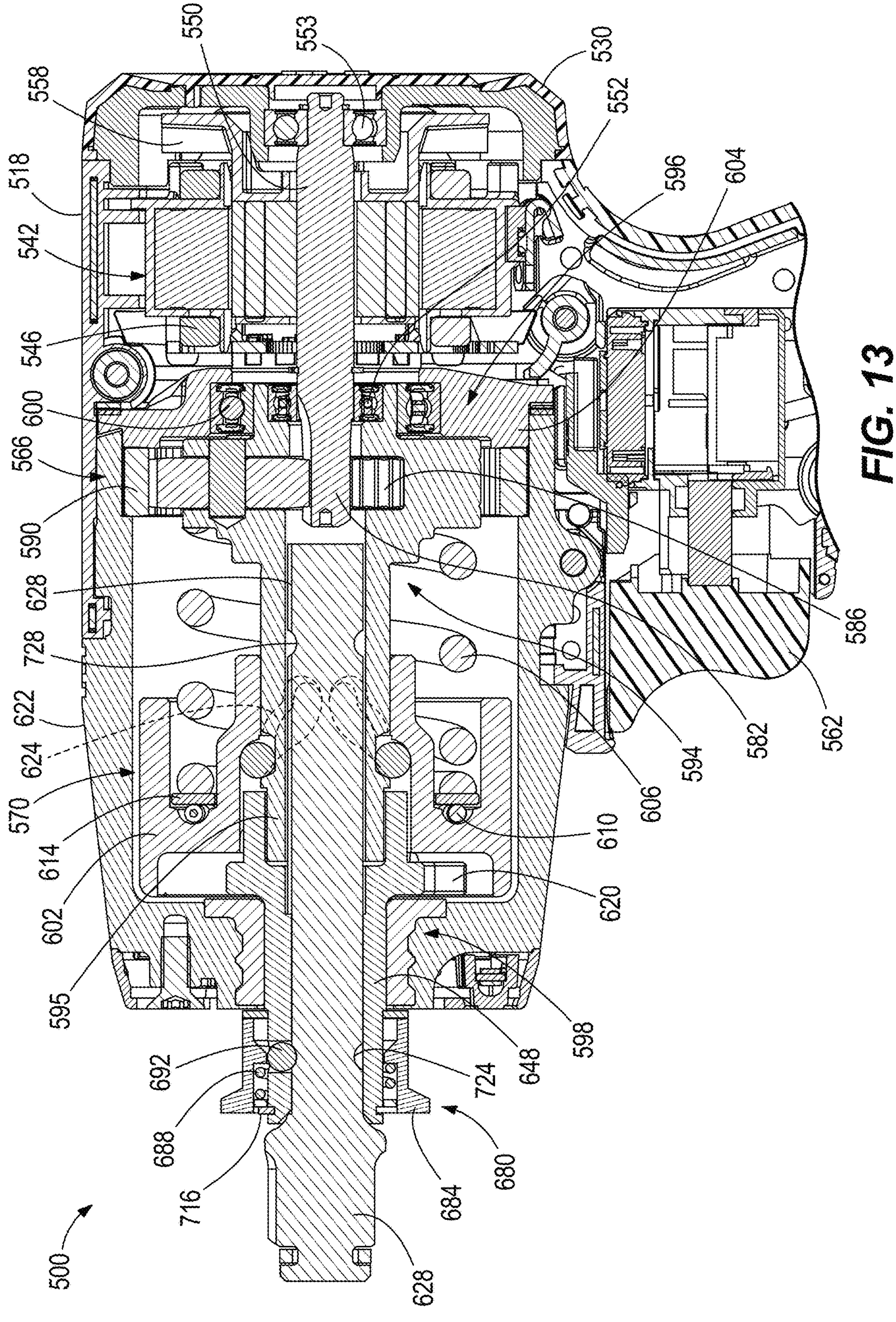
FIG. 13 is a cross-sectional view of the impact tool of FIG. 12, taken along line 13-13 in FIG. 12.
Figure 14:
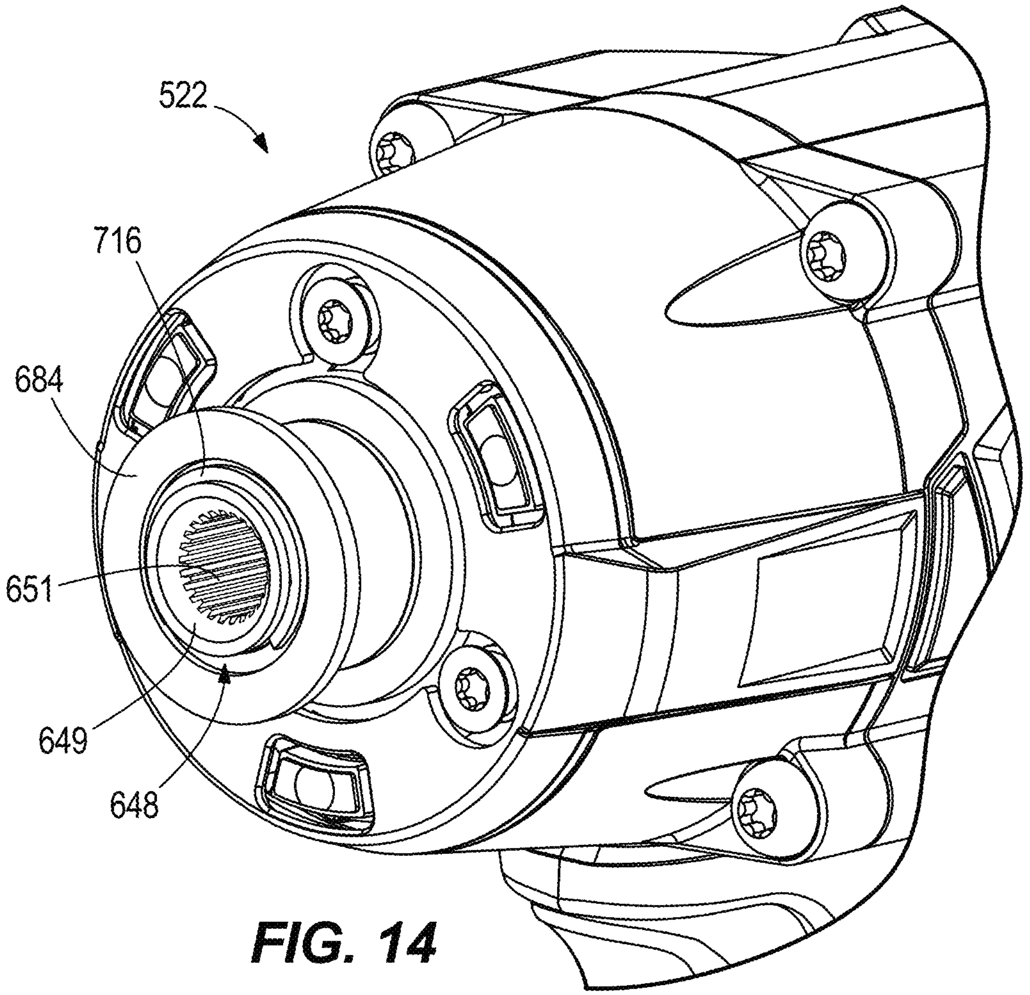
FIG. 14 is a perspective view of a front portion of the impact tool of FIG. 12, illustrating an anvil member and the retainer assembly.

In the embodiment of FIGS. 12-18, the impact tool 500 further includes a retainer assembly 680 slidably coupled to the anvil member 648 of the anvil assembly 598 and configured to retain the drive member 628 in a retracted position or an extended position. The retainer assembly 680 includes a collar 684 positioned along the anvil member 648, a spring 688, and a locking member, which is a locking ball 692 in the illustrated embodiment, positioned between the collar 684 and the drive member 628 (FIG. 13).

Figure 15:
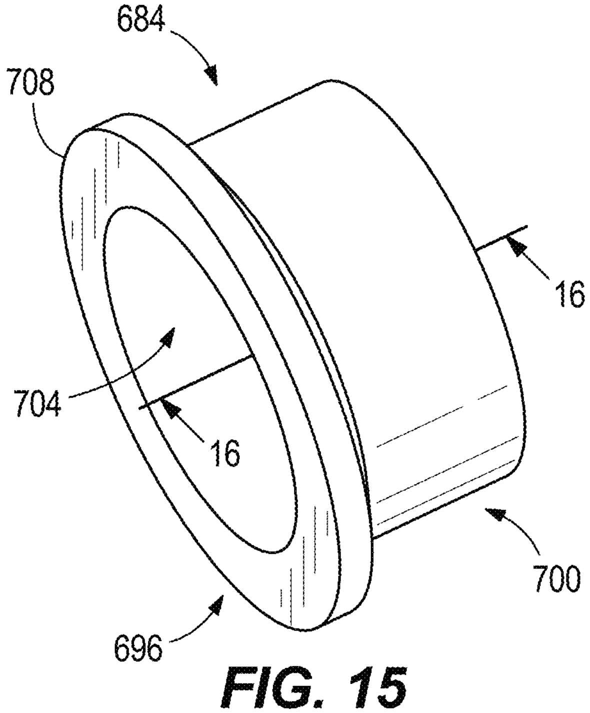
FIG. 15 is a perspective view of a collar of the retainer assembly of FIG. 12.
Figure 16:
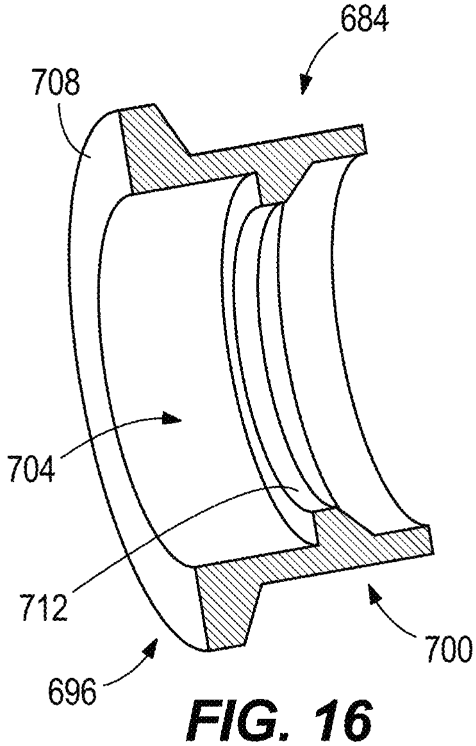
FIG. 16 is a cross-sectional view of the collar of FIG. 15, taken along line 16-16 in FIG. 15.
Figure 17:
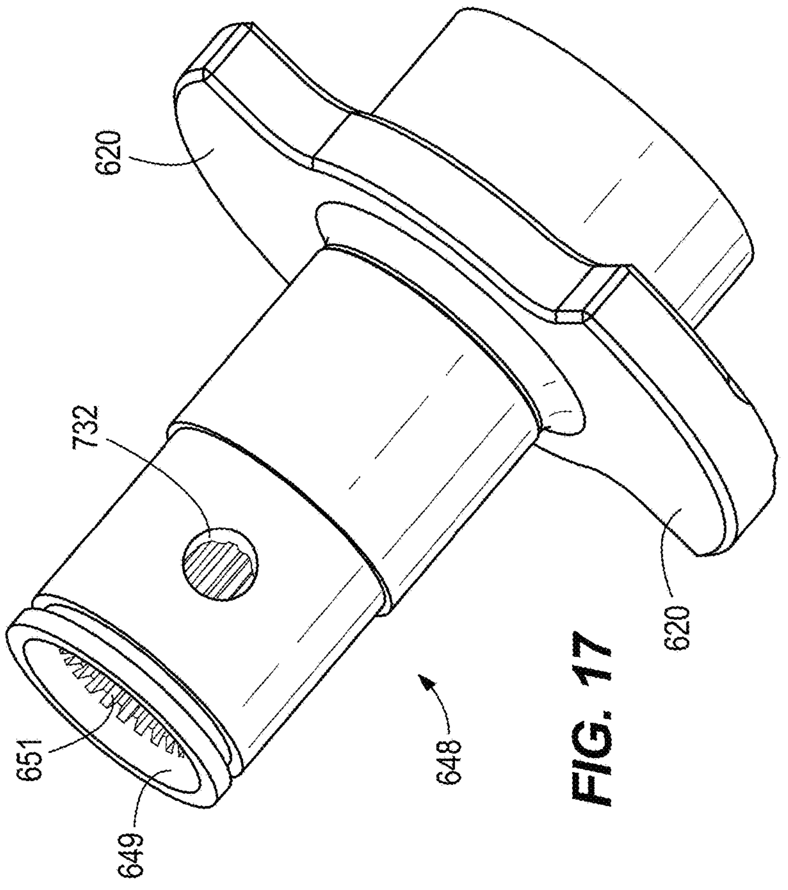
FIG. 17 is a perspective view of the anvil member of the impact tool of FIG. 14.

Referring to FIGS. 15-16, the collar 684 includes a first body portion 696, a second body portion 700, and a central bore 704 extending through the first and second body portions 696, 700. The first body portion 696 of the collar 684 includes a flange 708 extending outwardly. The second body portion 700 of the collar 684 is formed as a cylindrical body. The central bore 704 is configured to receive the anvil member 648 such that a spacing is provided between a surface of the central bore 704 of the collar 684 and a surface of the anvil member 648. The collar 684 further includes a ramp portion 712 extending inwardly from the central bore 704.

Referring again to FIG. 13, the spring 688 is positioned within the spacing defined between the collar 684 and the anvil member 648. Specifically, the spring 688 is located between the ramp portion 712 of the collar 684 and a retaining clip 716. The retaining clip 716 is positioned within a groove formed in a front portion of the anvil member 648, thereby enclosing a portion of the central bore 704 of the collar 684. The spring 688 is configured to bias the collar 684 in a direction towards the front housing portion 522 of the impact tool 500.

Figure 18:
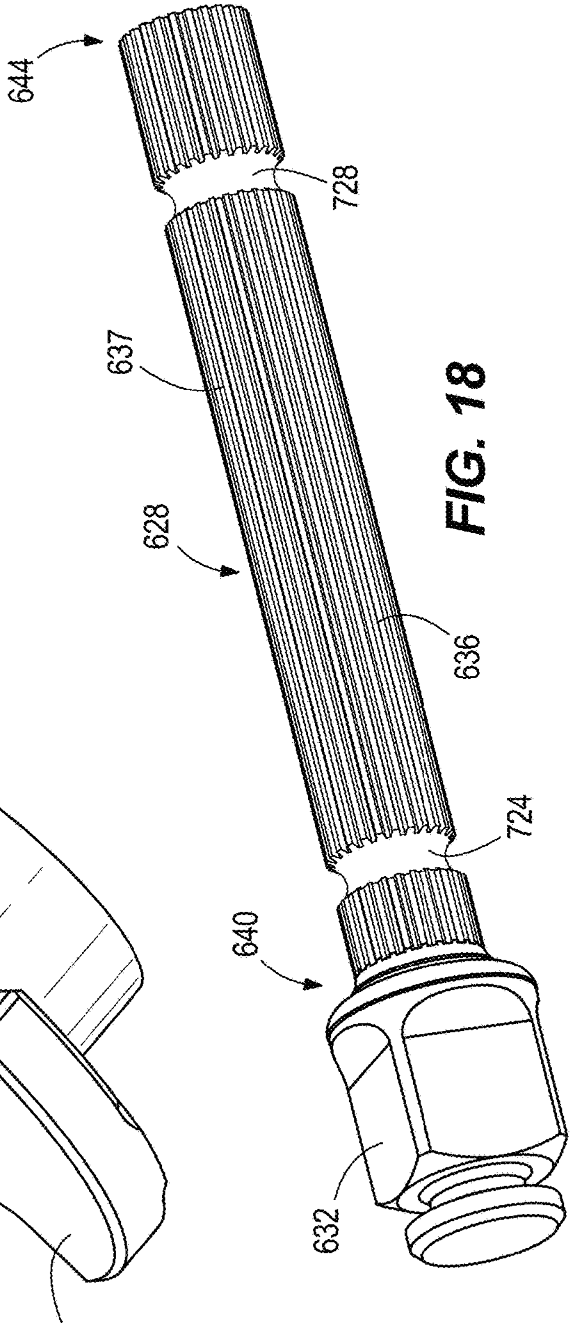
FIG. 18 is a perspective view of a drive member, which is insertable into the anvil member of FIG. 17 to define an anvil assembly.

Referring to FIG. 18, the drive member 628 includes a first groove 724 and a second groove 728 formed in the shaft portion 636 of the drive member 628. The first groove 724 is located proximate the first end 640 of the shaft portion 636, and the second groove 728 is located proximate the second end 644 of the shaft portion 636, such that the grooves 724, 728 are axially spaced along the length of the drive member 628. When the spring 688 biases the collar 684 towards the front housing portion 522, the ramp portion 712 of the collar 684 is configured to push the locking ball 692 into the first groove 724 to retain the drive member 628 in the retracted position or into the second groove 728 to retain the drive member 628 in the extended position. The locking ball 692 may extend through an aperture 732 (FIG. 16) in the anvil member 648 to position the locking ball 692 within the first or second groove 724, 728.

The collar 684 is configured to move between a locked position and an unlocked position. In the locked position, the collar 684 is biased in a first direction towards the front housing portion 522 of the impact tool 10, such that the ramp portion 712 pushes the locking ball 692 into the first groove 724 of the drive member 628 to lock the drive member 628 in the retracted position. A user may grasp the collar 684 and pull the collar 684 in a second direction opposite the first direction against the biasing force of the spring 688 towards the unlocked position. In the unlocked position, the ramp portion 712 of the collar 684 no longer aligns with the locking ball 692, thereby allowing the locking ball 692 to move radially outward and out of engagement with the first groove 724. The drive member 628 is then permitted to be adjusted by the user from the retracted position to the extended position. Once the drive member 628 is in the extended position, the locking ball 692 will move radially inward and into engagement with the second groove 728. The user may then release the collar 684 so that the spring 688 biases the collar 684 back into the first direction and the locked position. As such, the ramp portion 712 of the collar 684 aligns with the locking ball 692 to lock the drive member 628 in the extended position.

Figure 19:
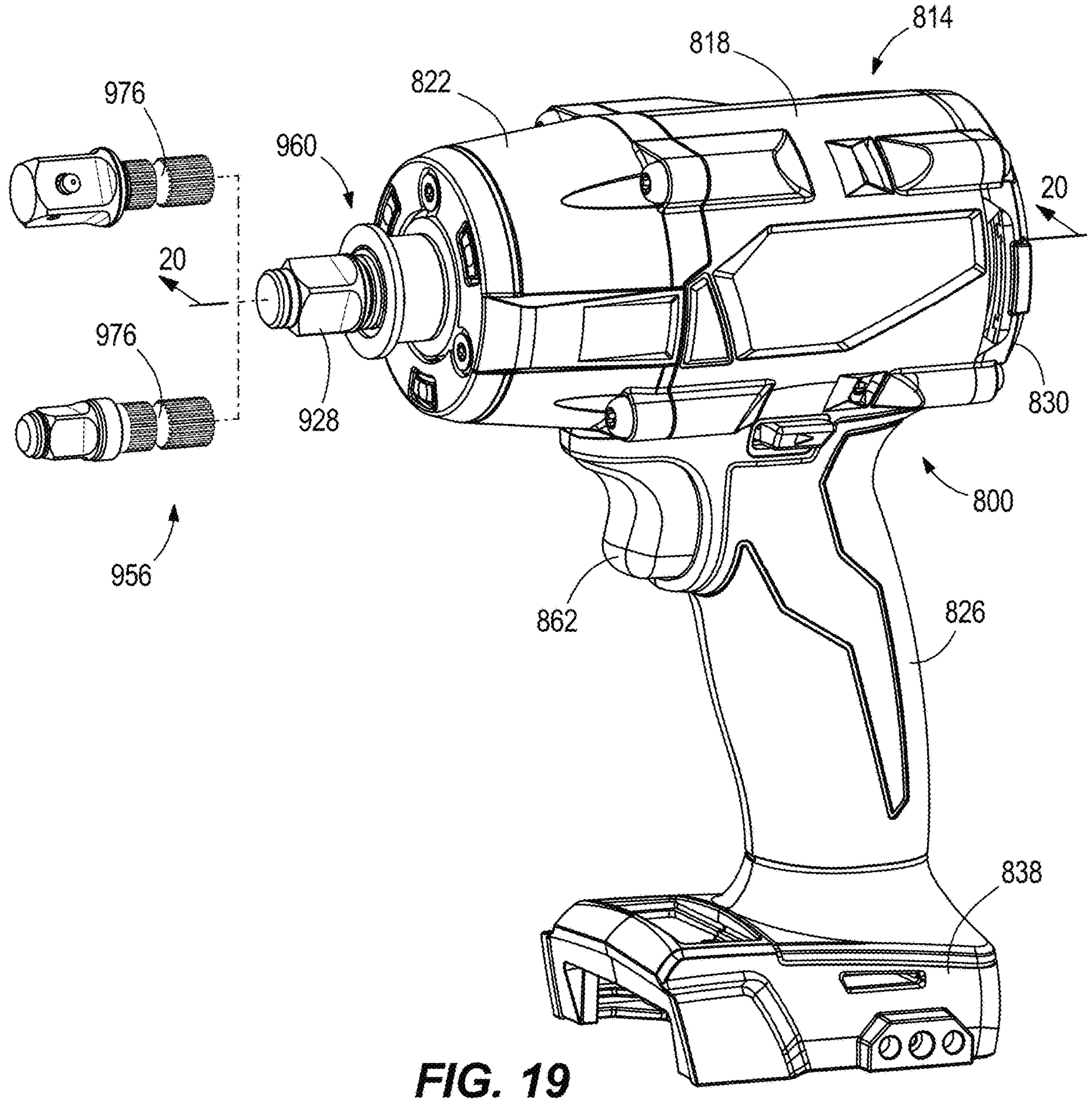
FIG. 19 is a perspective view of an impact tool according to another embodiment, illustrating a plurality of interchangeable drive members.
Figure 20:
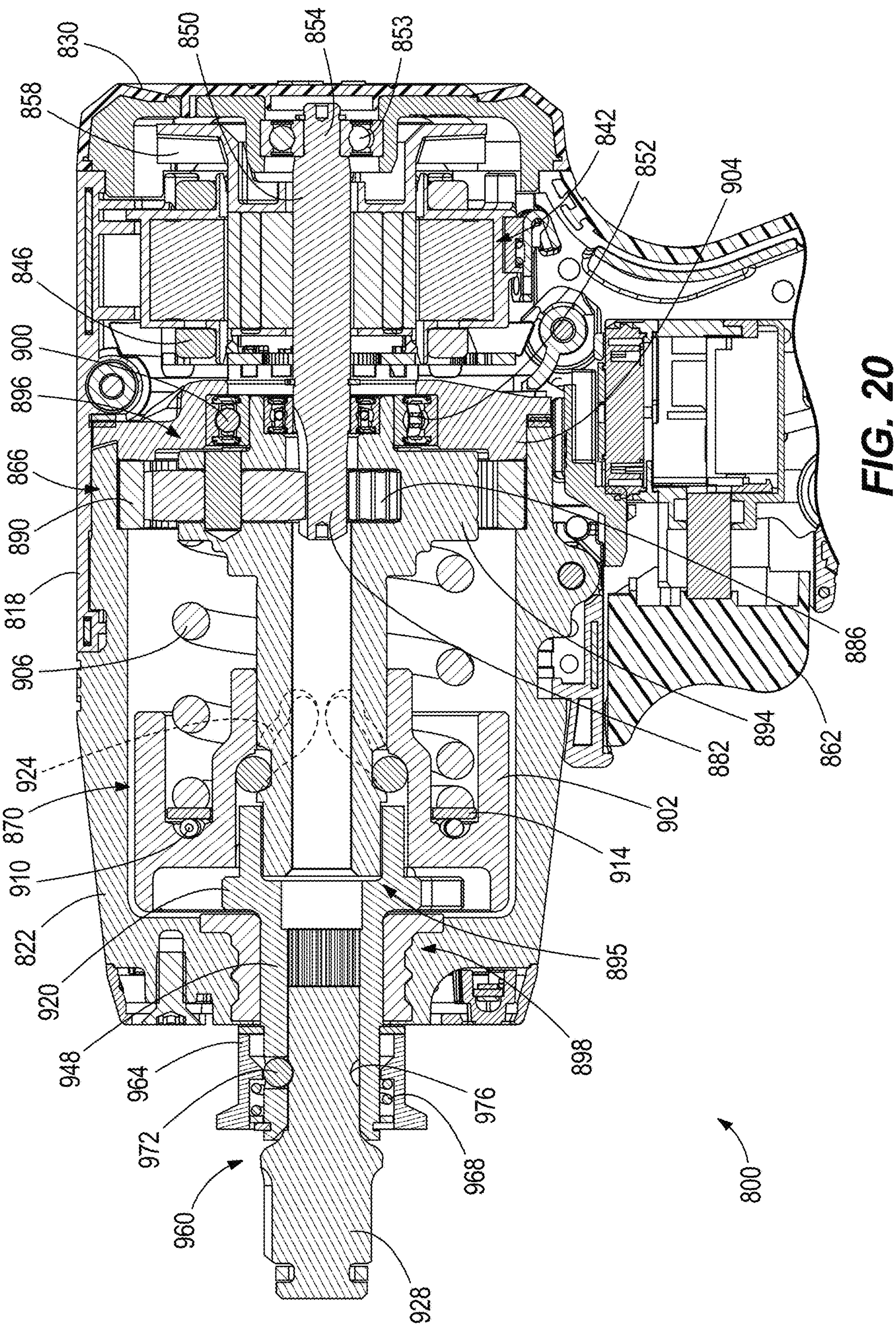
FIG. 20 is a cross-sectional view of the impact tool of FIG. 19, taken along line 20-20 in FIG. 17.
Figure 21:
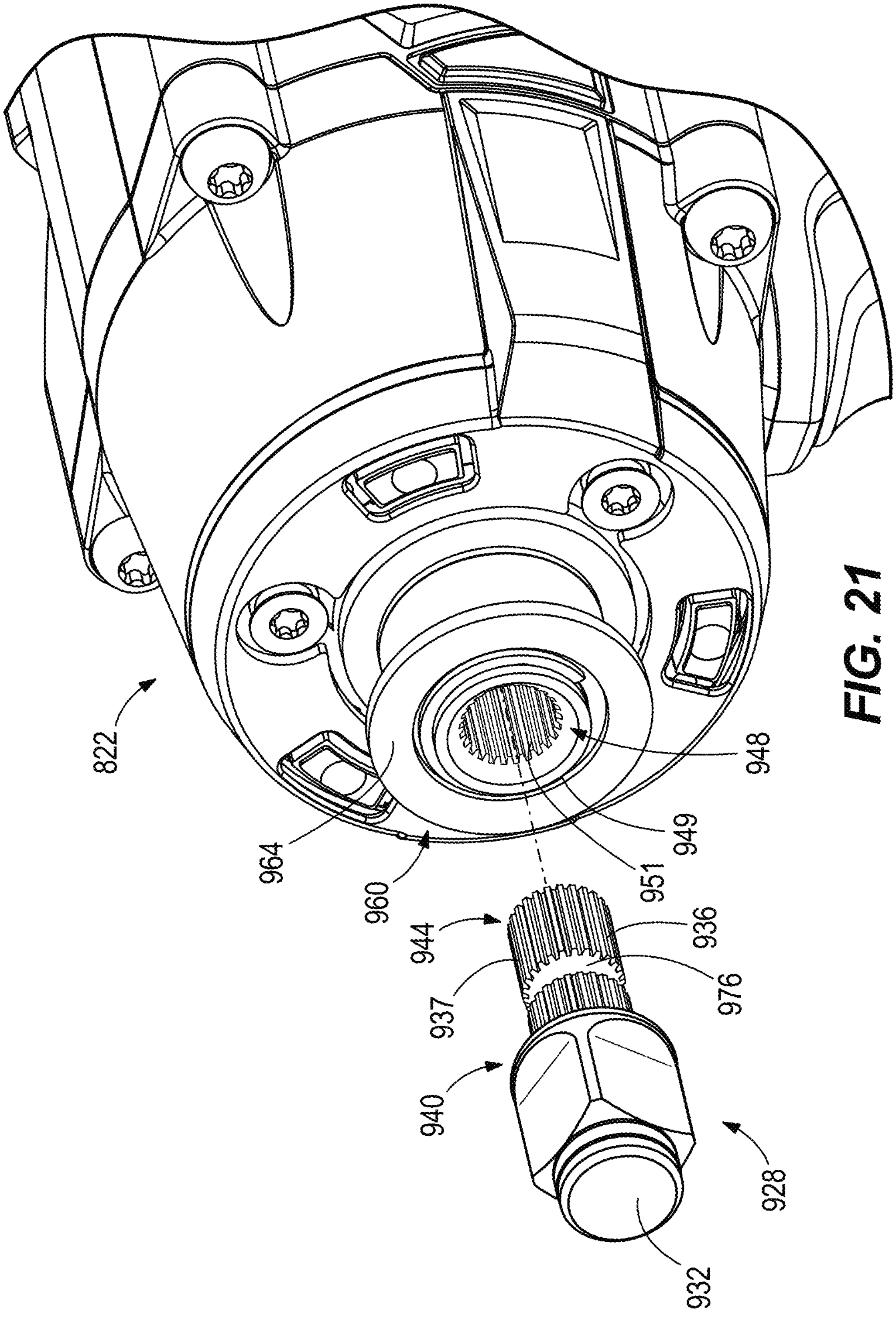
FIG. 21 is a perspective view of a front portion of the impact tool of FIG. 19, illustrating an anvil member, a retainer assembly, and one of the plurality of interchangeable drive members of FIG. 19 insertable into the anvil member.

Referring to FIGS. 19-21, another embodiment of an impact tool 800 is illustrated. The impact tool 800 is similar to the impact to of FIGS. 1-8; therefore, like structure will be identified by like reference number plus "800" and only the differences will be discussed hereafter.

In the embodiment of FIGS. 19-21, the drive member 928 may be one of a plurality of interchangeable drive members 956, each having a different length and/or drive geometry (FIG. 19). The anvil member 948 is configured to receive one drive member 928 of the plurality of interchangeable drive members 956, and the drive member 928 can be removed and substituted with another of the interchangeable drive members 956 to suit a particular fastening task.

Referring to FIG. 19, a retainer assembly 960, such as the retainer assembly 680 of FIGS. 12-18, is coupled to the anvil member 948 of the anvil assembly 898 and configured to lock one drive member 928 of the plurality of interchangeable drive members 956 into the anvil member 948. As such, the retainer assembly 960 includes a collar 964, a spring 968, and a locking ball 972 (FIG. 20).

A groove 976 is formed onto the body or shaft portion 936 of each drive member 928 of the plurality of interchangeable drive member 956 (FIGS. 20-21). Each interchangeable drive member 928 can thus be locked into the anvil member 948 once the locking ball 972 is pushed into a respective groove 976 of a drive member 928 as the spring 968 biases the collar 964 towards the front housing portion 822. Once the user pulls the collar 964 against the biasing force of the spring 968, the interchangeable drive member 928 may then be removed from the anvil member 948. As the collar 964 is still being pulled by the user, another one of the interchangeable drive members 956 can be inserted into the anvil member 948 so that the locking ball 972 is aligned with the respective groove 976 of the other interchangeable drive member 956. After the user releases the collar 964, the spring 968 again biases the collar 964 towards the front housing portion 822 to push the locking ball 692 into the respective groove 976 of the other interchangeable drive member 928 to lock the other interchangeable drive member 928 within the anvil member 948.

Having the ability to change the plurality of interchangeable drive members 956 allows the anvil member 948 to vary in size and form. Based on the application in which the tool 800 will be used, only the drive member 928 of the anvil member 948 need be changed rather the tool 800 itself. For example, each of the plurality of interchangeable drive members 956 can have a head with a different nominal size, such as ⅜", ½", ¾", 1", or the like, although the nominal size of each interchangeable drive member 928 is not limited to these measurements. Each of the plurality of interchangeable drive members 956 can also have a different retention structure for the tool element 99, such as a friction ring, a pin detent, and other configurations.

Various features and aspects of the disclosure are set forth in the following claims.

What is claimed is:

1. An impact tool comprising:

a housing;

a motor supported within the housing; and a drive assembly supported within the housing and configured to convert a constant rotational force provided by the motor into a striking rotational force, the drive assembly including an anvil assembly and a hammer configured to deliver the striking rotational force to the anvil assembly, wherein the anvil assembly includes a plurality of interchangeable drive members, each drive member of the plurality of interchangeable drive members having a shaft portion and a head portion extending from the shaft portion and configured for coupling to a tool element, and an anvil member having a bore configured to receive the shaft portion of a selected drive member of the plurality of interchangeable drive members, wherein the bore and the shaft portion include cooperating spline patterns such that the selected drive member is coupled for co-rotation with the anvil member when received in the bore of the anvil member.

2. The impact tool of claim 1, wherein the head portion of each drive member of the plurality of interchangeable drive members has a different nominal size configured for coupling to a differently sized tool element.

3. The impact tool of claim 1, wherein the head portion of each drive member of the plurality of interchangeable drive members has a different length.

4. The impact tool of claim 1, wherein the motor is an electric motor, wherein the housing includes a battery receptacle, and wherein the impact tool further comprises a battery removably coupled to the battery receptacle and configured to provide power to the electric motor.

5. The impact tool of claim 1, wherein the selected drive member is configured to be locked into the anvil member when received in the bore.

6. An impact tool comprising:

a housing;

a motor supported within the housing; and a drive assembly supported within the housing and configured to convert a constant rotational force provided by the motor into a striking rotational force, the drive assembly including an anvil assembly and a hammer configured to deliver the striking rotational force to the anvil assembly, wherein the anvil assembly includes a drive member having a shaft portion and a head portion extending from the shaft portion and configured for coupling to a tool element, and an anvil member having a bore configured to receive the shaft portion, wherein the bore and the shaft portion include cooperating spline patterns such that the drive member and the anvil member are coupled for co-rotation when the shaft portion is received within the bore, wherein the drive member includes a retaining member supported by the shaft portion of the drive member and configured to engage the anvil member to retain the drive member in an axial position relative to the anvil member.

7. The impact tool of claim 6, wherein the anvil member includes a recess configured to receive the retaining member to axially retain the drive member within the anvil member.

8. The impact tool of claim 7, wherein the drive member is one of a plurality of interchangeable drive members, each drive member of the plurality of interchangeable drive members having a head portion and a shaft portion, wherein the shaft portion of each drive member of the plurality of interchangeable drive members is identical.

9. The impact tool of claim 8, wherein the head portion of each drive member of the plurality of interchangeable drive members has a different nominal size configured for coupling to a differently sized tool element.

10. The impact tool of claim 8, wherein the head portion of each drive member of the plurality of interchangeable drive members has a different length.

11. The impact tool of claim 6, wherein the motor is an electric motor.

12. The impact tool of claim 6, wherein the motor is configured to be driven by a pneumatic power source.

13. A multi-piece anvil for an impact tool, comprising:

an anvil member including a body, an anvil lug extending outwardly from the body, the anvil lug configured to be impacted by a hammer of the impact tool, and a bore extending at least partially through the body; and a drive member including a shaft portion, and a head portion configured to extend outwardly from a housing of the impact tool, the head portion having a plurality of drive surfaces and configured to be coupled to a tool element, wherein the shaft portion includes a first engagement feature, and the anvil member includes a second engagement feature, wherein the shaft portion is insertable into the bore to couple the drive member for co-rotation with the anvil member via the first engagement feature and the second engagement feature, wherein the drive member is one of a plurality of interchangeable drive members, each drive member of the plurality of interchangeable drive members having a head portion and a shaft portion, and wherein the shaft portion of each drive member of the plurality of interchangeable drive members is identical.

14. The multi-piece anvil of claim 13, wherein the first engagement feature and the second engagement feature are cooperating spline geometries, which allow the drive member to move axially along the bore of the anvil member.

15. The multi-piece anvil of claim 13, wherein the drive member includes a retaining member supported by the shaft portion of the drive member and configured to retain the drive member in an axial position relative to the anvil member, and wherein the anvil member includes a recess configured to receive the retaining member to axially retain the drive member in the anvil member.

16. The multi-piece anvil of claim 13, wherein the head portion of each drive member of the plurality of interchangeable drive members has a different nominal size configured for coupling to a differently sized tool element.

17. The multi-piece anvil of claim 13, wherein the head portion of each drive member of the plurality of interchangeable drive members has a different length.

* * * * *